(12) United States Patent
Dolezal et al.

(10) Patent No.: US 10,625,350 B2
(45) Date of Patent: Apr. 21, 2020

(54) ADJUSTABLE PRECISION EDGE BREAK DEVICE

(71) Applicant: The Boeing Company, Chicago, IL (US)

(72) Inventors: William J. Dolezal, Federal Way, WA (US); Loren J. Fiske, Scottsdale, AZ (US); Keith A. Walton, Kent, WA (US); Nicholas J. Loch, Des Moines, WA (US); Jason T. Stallman, Enumclaw, WA (US); Lester C. Tardiff, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/697,520

(22) Filed: Sep. 7, 2017

(65) Prior Publication Data
US 2019/0070675 A1 Mar. 7, 2019

(51) Int. Cl.
*B23C 3/12* (2006.01)
*B23C 1/20* (2006.01)
(Continued)

(52) U.S. Cl.
CPC .......... *B23C 3/126* (2013.01); *B23C 2215/04* (2013.01); *B23C 2220/40* (2013.01);
(Continued)

(58) Field of Classification Search
CPC . B23C 3/126; B23C 2220/16; B23C 2255/00; B23C 2255/08; B23C 2255/12; B26D 3/02; Y10T 409/306496; Y10T 409/304144; Y10T 409/308176; Y10T 409/3084; Y10T 409/308624
(Continued)

(56) References Cited

U.S. PATENT DOCUMENTS 2,409,377 A * 10/1946 Miller .................. G01B 3/28
                                                    408/112
3,285,135 A * 11/1966 Shaw .................. B27C 5/10
                                                    144/136.1
(Continued)

FOREIGN PATENT DOCUMENTS

DE       4138022 A1 *  3/1993
DE      19830096 A1 *  1/2000
(Continued)

OTHER PUBLICATIONS

ToolsToday, "Plastic Cutting Router Bits", https://www.toolstoday.com/c-312-plastic-cutting-router-bits.aspx.

*Primary Examiner* — Erica E Cadugan
(74) *Attorney, Agent, or Firm* — Perman & Green, LLP

(57) ABSTRACT

An edge break apparatus including a frame having a first workpiece interface surface, a second workpiece interface surface arranged relative to the first workpiece interface surface so as to form a predetermined angle between the first workpiece surface and the second workpiece surface, and a first aperture extending through the frame so as to intersect the predetermined angle, and an edge break member extending through and interfaced with the first aperture so as to adjustably define a cutting depth of the edge break member relative to an apex of the predetermined angle.

20 Claims, 10 Drawing Sheets

(51) Int. Cl.
*B24B 9/00* (2006.01)
*B24B 23/02* (2006.01)
*B26D 3/02* (2006.01)

(52) U.S. Cl.
CPC ...... *B23C 2226/27* (2013.01); *B23C 2255/08* (2013.01); *B24B 9/00* (2013.01); *B24B 23/02* (2013.01); *B26D 3/02* (2013.01); *Y10T 409/303752* (2015.01); *Y10T 409/304144* (2015.01); *Y10T 409/306496* (2015.01); *Y10T 409/307952* (2015.01); *Y10T 409/308624* (2015.01)

(58) Field of Classification Search
USPC ........ 409/180, 138, 210, 214, 218; 451/344, 451/358
See application file for complete search history.

(56) References Cited

U.S. PATENT DOCUMENTS

| | | | | |
|---|---|---|---|---|
| 3,893,372 | A * | 7/1975 | Strakeljahn | B23C 3/126 144/136.95 |
| 4,988,245 | A * | 1/1991 | Fukuda | B23C 3/126 144/136.95 |
| D353,314 | S * | 12/1994 | Jaslow | D8/70 |
| 5,423,642 | A * | 6/1995 | Heck | B23C 3/12 144/136.8 |
| 6,702,659 | B1 * | 3/2004 | Moncrieff | B23D 51/02 125/13.01 |
| 7,029,212 | B2 * | 4/2006 | Adkins | B23C 1/20 409/180 |
| 7,261,499 | B2 | 8/2007 | Mathis et al. | |
| 7,410,333 | B2 * | 8/2008 | Henzler | B23C 1/20 144/136.95 |
| 8,961,082 | B2 * | 2/2015 | Jeon | B23C 3/122 144/136.95 |
| 2019/0283146 | A1 * | 9/2019 | Berube | B23C 1/12 |

FOREIGN PATENT DOCUMENTS

| | | | |
|---|---|---|---|
| FR | 2811249 A1 | * | 1/2002 |
| JP | 63-016913 A | * | 1/1988 |
| JP | 2010-012560 A | * | 1/2010 |
| WO | WO-2006/122532 A1 | * | 11/2006 |

* cited by examiner

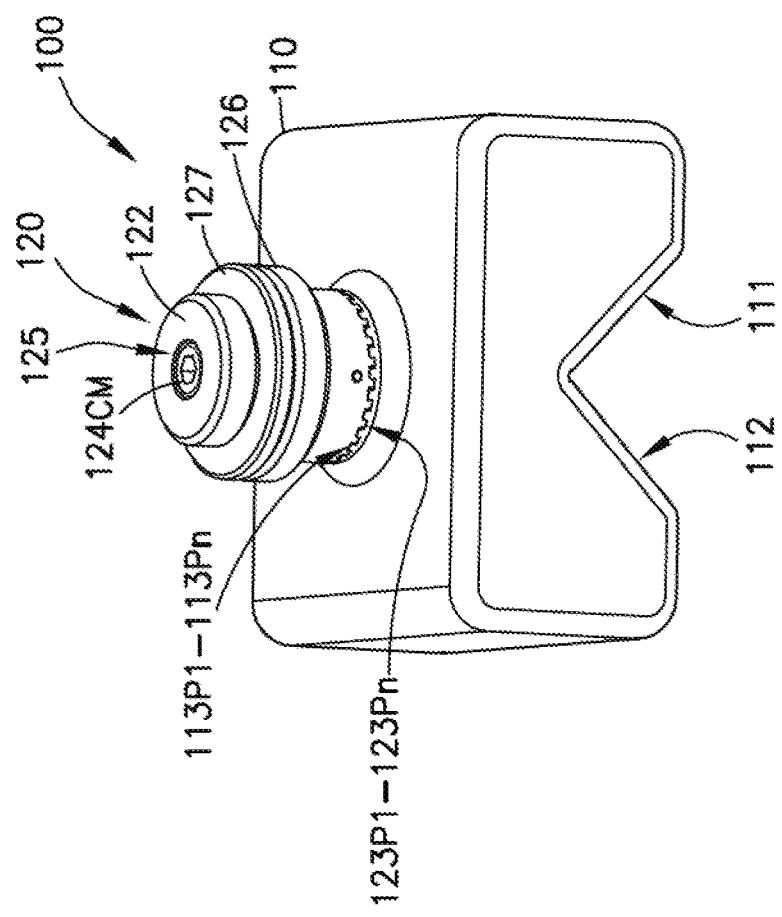
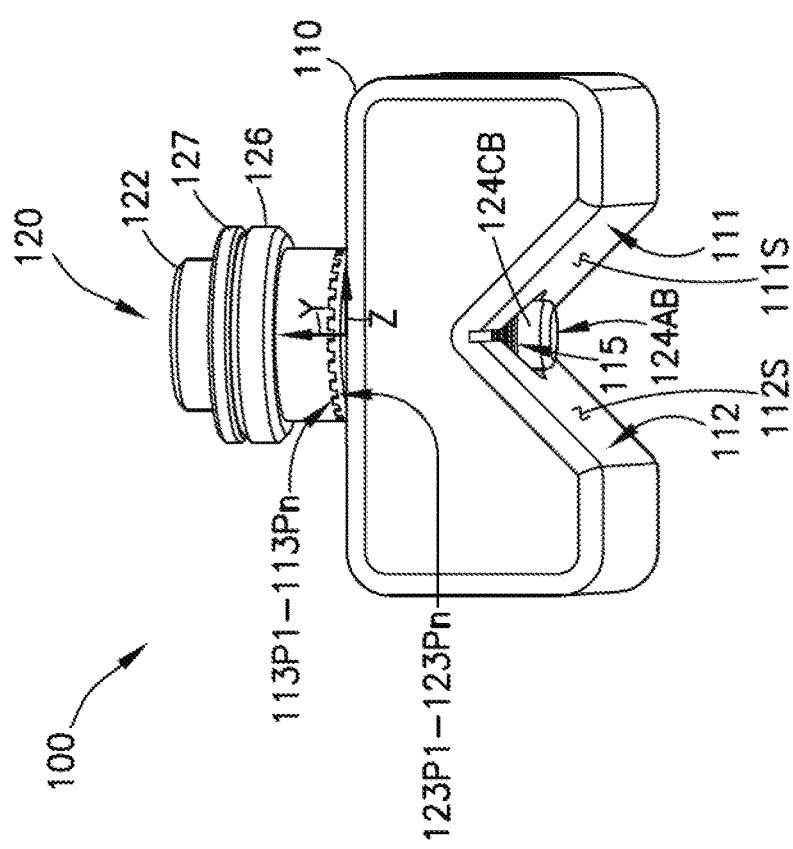

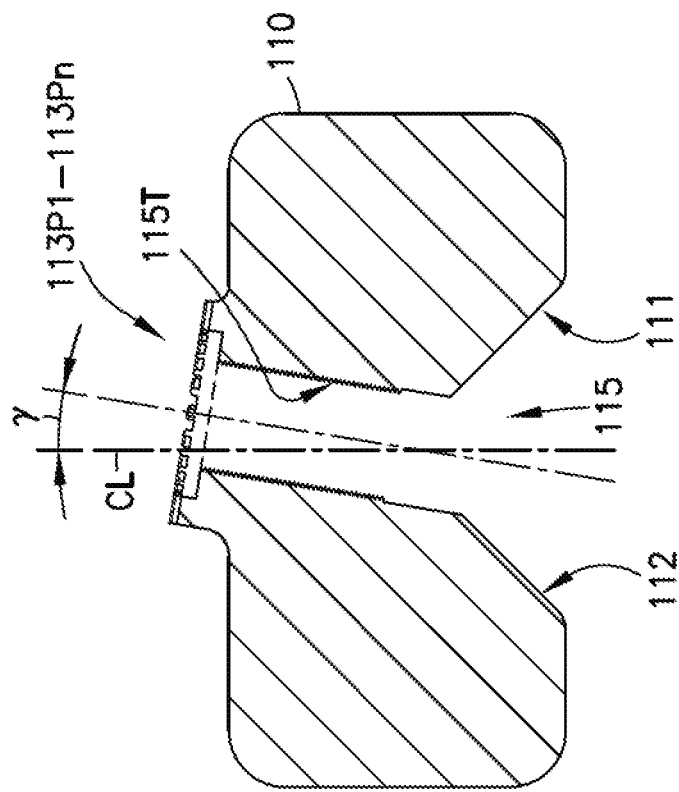
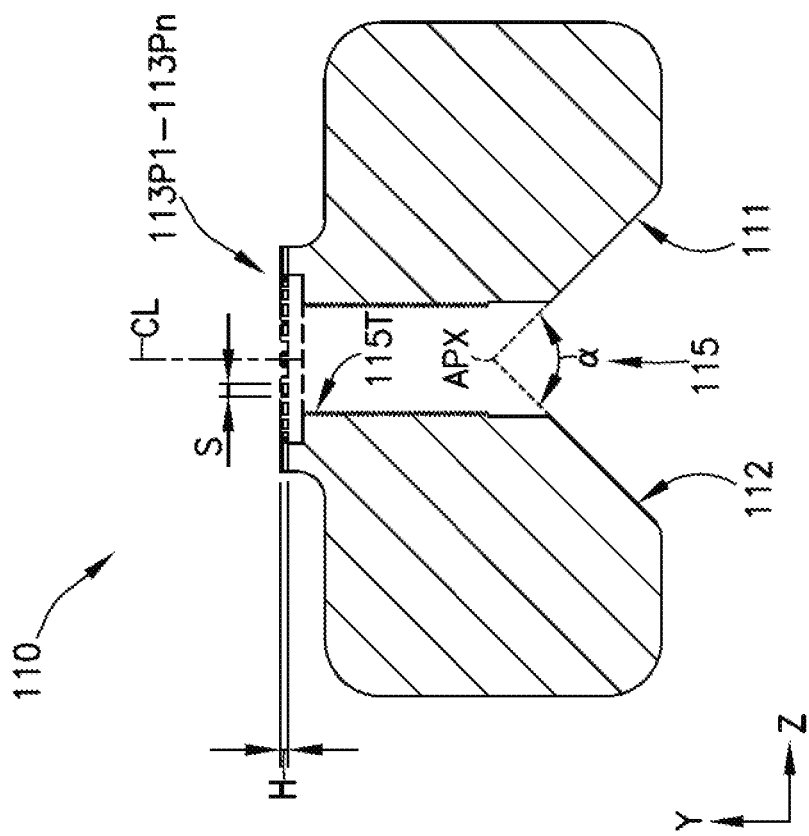
FIG.2A
FIG.2B

Decoupling a Cutting Bit of the Edge Break Member From a Housing of the Edge Break Member and Coupling a Different Cutting Bit to the Housing of the Edge Break Member.

FIG. 8

ADJUSTABLE PRECISION EDGE BREAK DEVICE

BACKGROUND

1. Field

The exemplary embodiments generally relate to edge break devices and in particular to adjustable edge break devices.

2. Brief Description of Related Developments

When machining composite parts, e.g., Carbon Fiber Reinforced Plastics, such as for the aerospace industry, the composite parts are typically generated with excess material that protrudes from the edges. In order to handle the composite parts, the edges are chamfered or broken to smooth the edge.

Conventionally, to break or chamfer the sharp edges of the composite parts, a mechanic sands the edges of the composite parts with a sanding block using "touch feel" knowledge and skill. This "touch feel" knowledge and skill is subjective to each individual mechanic, which typically leads to mechanics applying different pressures and sanding the edges to different depths above or below a predetermined depth. The angle of the edge break between different mechanics and different composite parts may also vary producing an appearance of inconsistencies. Additionally, if a mechanic does not apply the correct chamfer angle while sanding, the finished part may not meet specification. Incorrect chamfer depths and angles may lead to scrapping the composite part.

SUMMARY

Accordingly, apparatuses and methods, intended to address at least the above-identified concerns, would find utility.

The following is a non-exhaustive list of examples, which may or may not be claimed, of the subject matter according to the present disclosure.

One example of the subject matter according to the present disclosure relates to an edge break apparatus including a frame having a first workpiece interface surface, a second workpiece interface surface arranged relative to the first workpiece interface surface so as to form a predetermined angle between the first workpiece surface and the second workpiece surface, and a first aperture extending through the frame so as to intersect the predetermined angle, and an edge break member extending through and interfaced with the first aperture so as to adjustably define a cutting depth of the edge break member relative to an apex of the predetermined angle.

Another example of the subject matter according to the present disclosure relates to an edge break apparatus including a frame having a first aperture and an edge surface configured to engage workpiece surfaces adjacent a corner of a workpiece, and an edge break member extending through the first aperture, the edge break member being configured to cut the corner of the workpiece to provide a predetermined workpiece edge contour, where the edge break member is coupled to the frame so as to be incrementally movable relative to the edge surface for adjustably increasing or decreasing a size of the predetermined workpiece contour.

Still another example of the subject matter according to the present disclosure relates to a method for using an edge break apparatus including a frame having a first aperture and an edge surface and an edge break member extending through the first aperture, the method including incrementally moving the edge break member relative to the edge surface to adjustably increase or decrease a cutting depth of the edge break member relative to the edge surface, engaging workpiece surfaces adjacent a corner of a workpiece with the edge surface of the frame, and cutting the corner of the workpiece, by sliding the edge break apparatus along the workpiece surfaces, to provide a predetermined workpiece edge contour.

BRIEF DESCRIPTION OF THE DRAWINGS

Figure 1A:
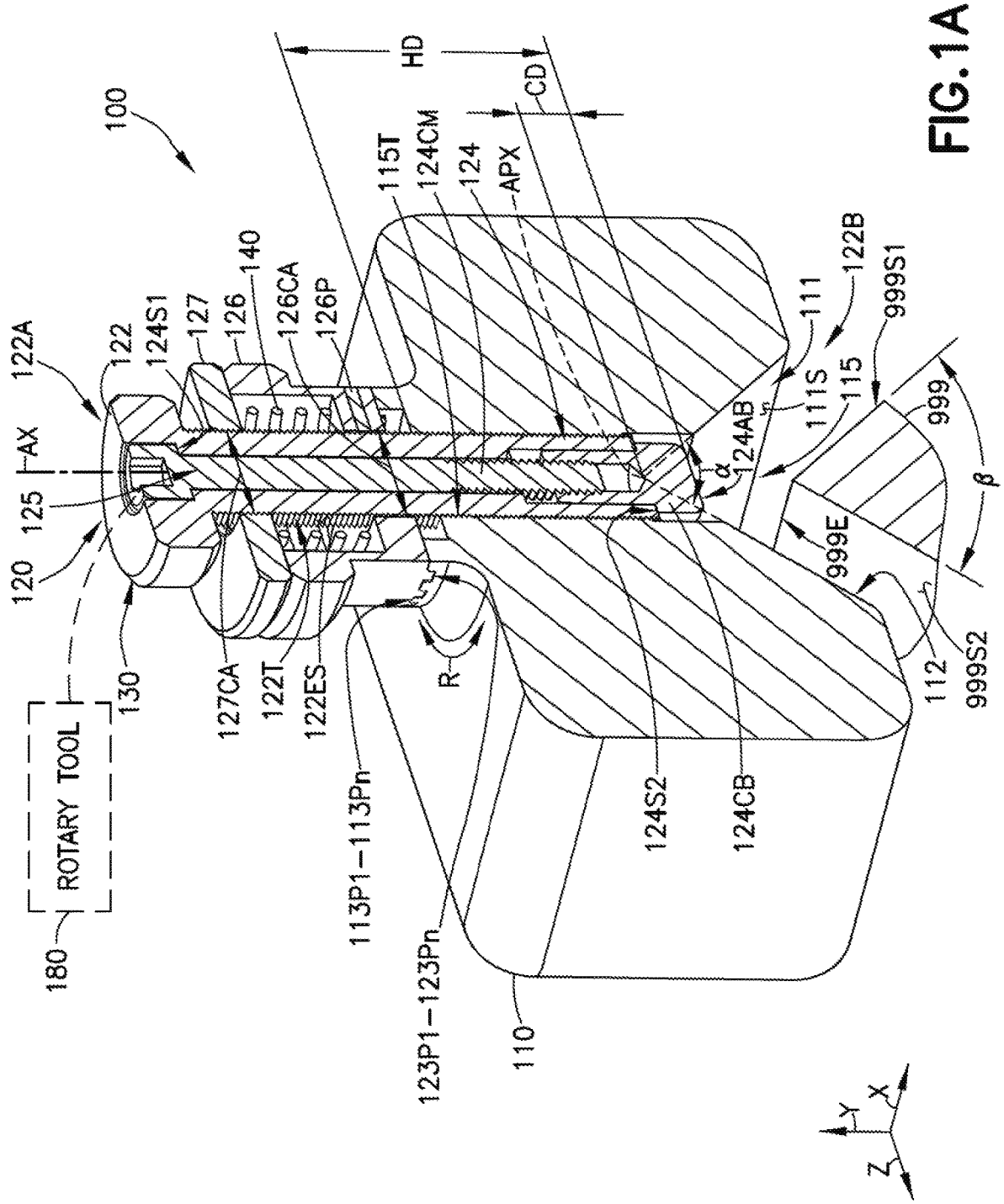
Figure 1D:
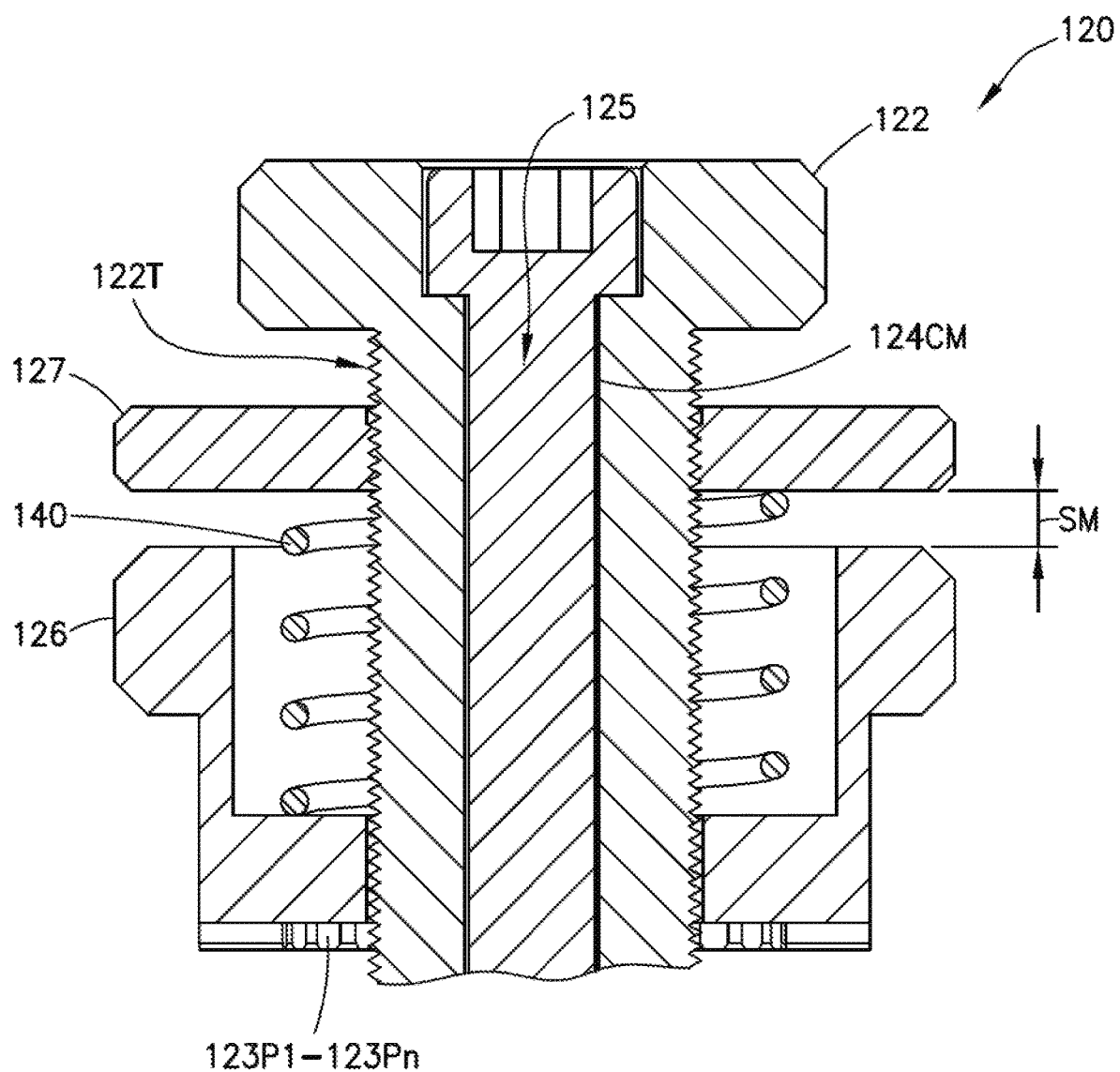
Figure 3:
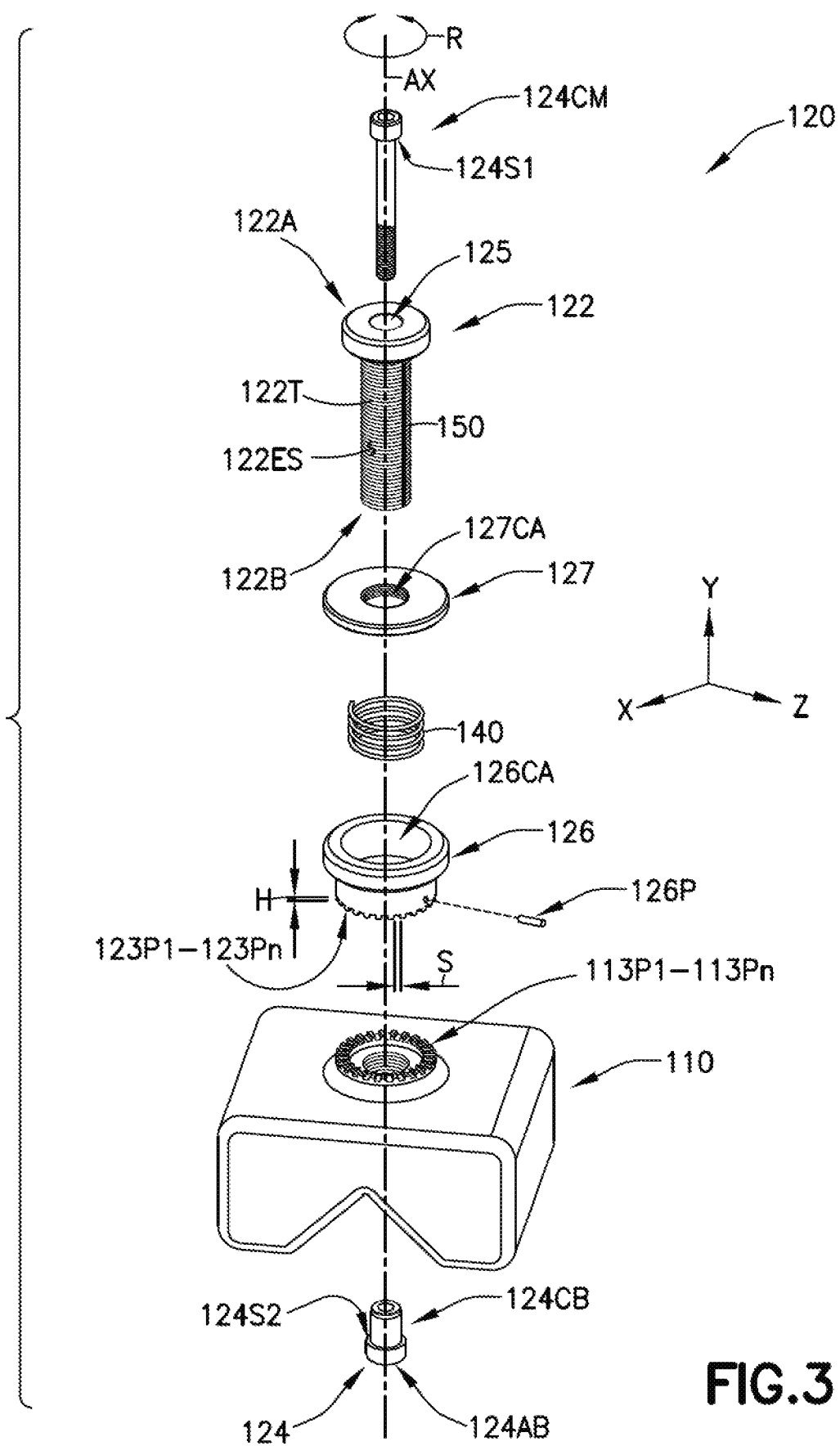
Figure 4A:
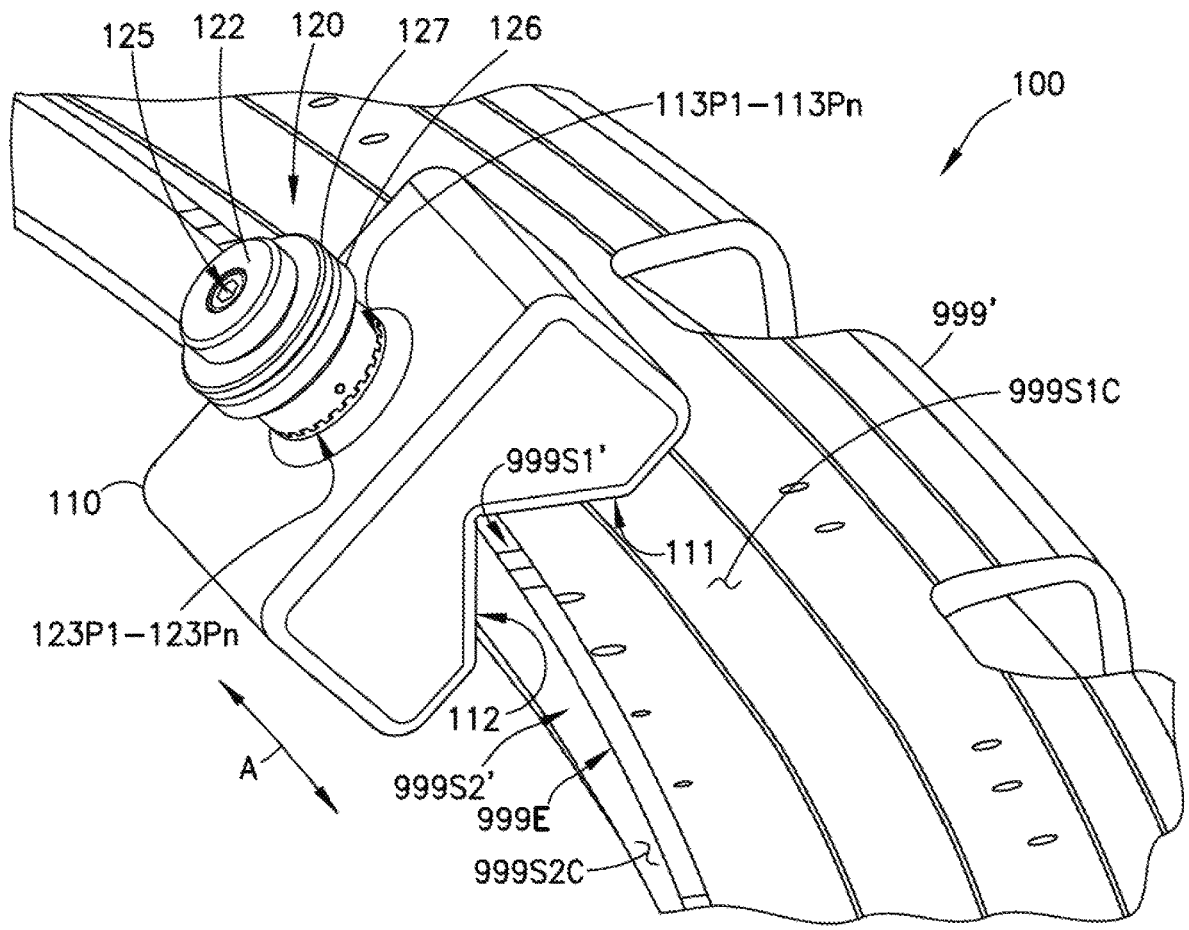
Figure 4B:
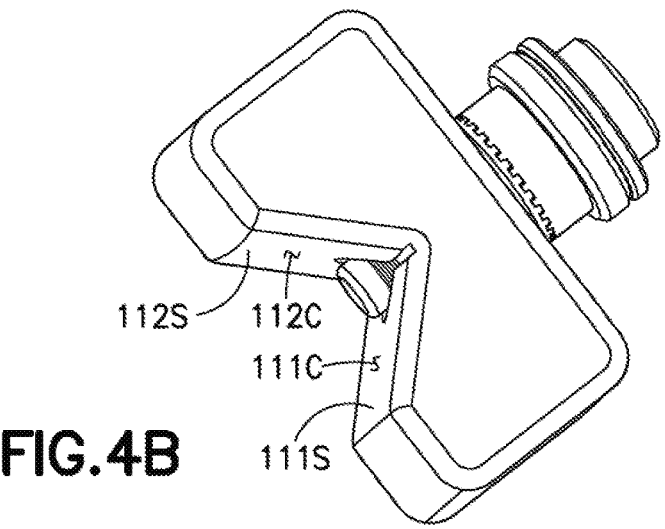
Figure 5:
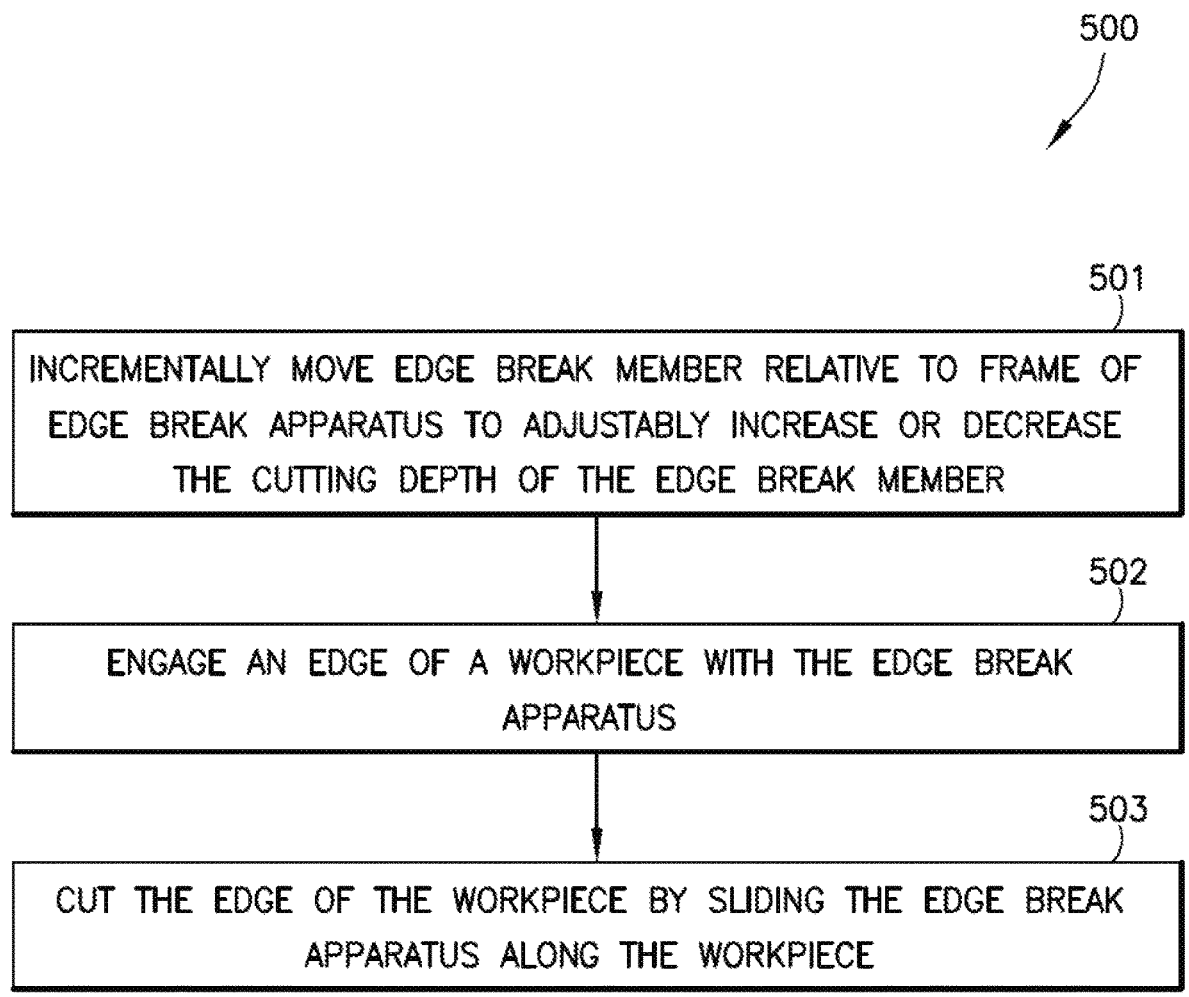
Figure 6:
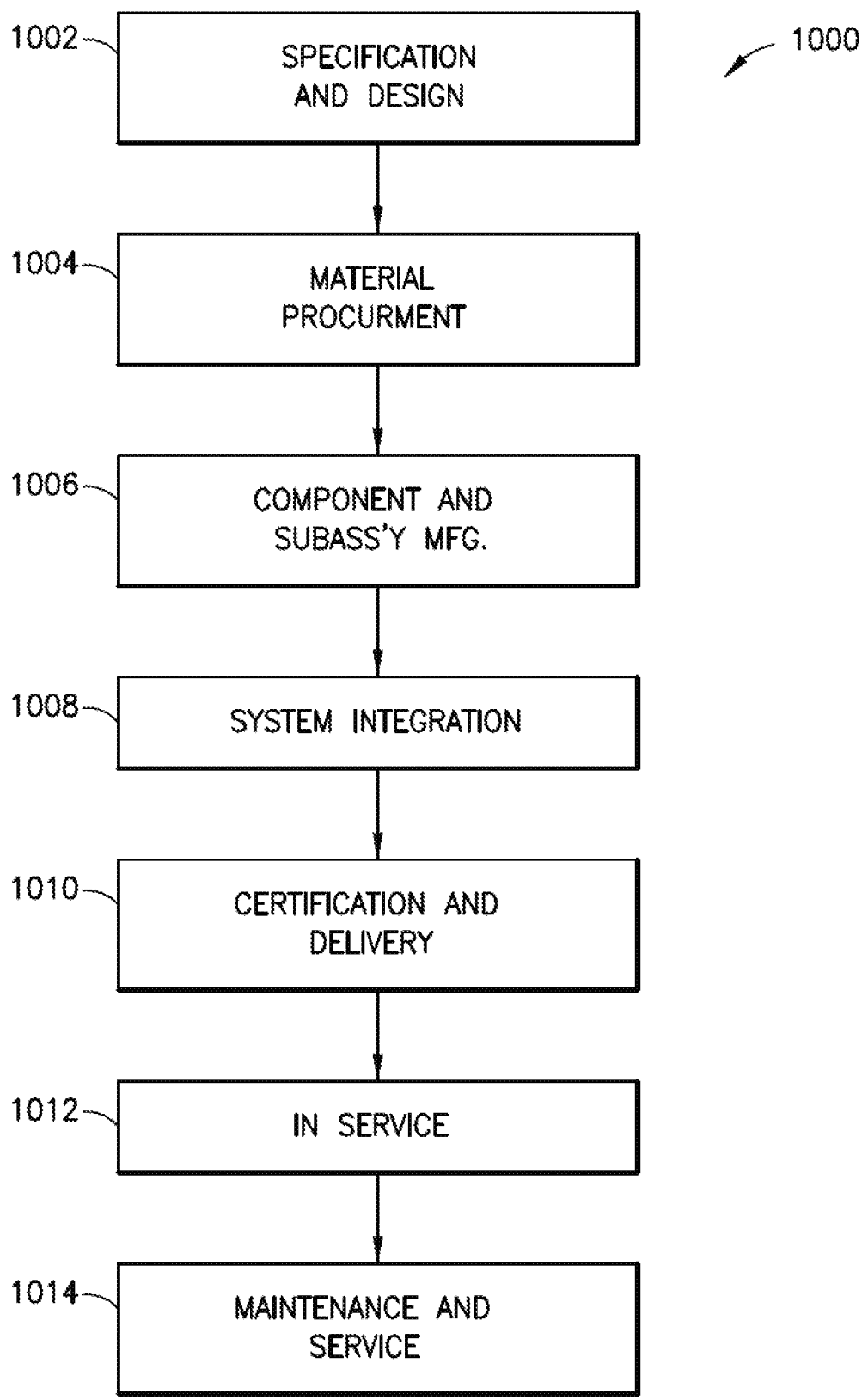

Having thus described examples of the present disclosure in general terms, reference will now be made to the accompanying drawings, which are not necessarily drawn to scale, and wherein like reference characters designate the same or similar parts throughout the several views, and wherein:

FIG. 1A is a cross-sectional perspective view of an edge break apparatus in accordance with one or more aspects of the present disclosure;

FIG. 1B is a bottom perspective view of the edge break apparatus of FIG. 1A in accordance with one or more aspects of the present disclosure;

FIG. 1C is a top perspective view of the edge break apparatus of FIG. 1A in accordance with one or more aspects of the present disclosure;

FIG. 1D is a side view of a portion of the edge break apparatus of FIG. 1A in accordance with one or more aspects of the present disclosure;

FIG. 2A is a side cross-sectional view of a portion of the edge break apparatus of FIG. 1A in accordance with one or more aspects of the present disclosure;

FIG. 2B is a side cross-sectional view of a portion of the edge break apparatus of FIG. 1A in accordance with one or more aspects of the present disclosure;

FIG. 3 is a top perspective exploded illustration of portions of an edge break apparatus of FIG. 1A in accordance with one or more aspects of the present disclosure;

FIG. 4A is a top perspective view of the edge break apparatus of FIG. 1A and a workpiece in accordance with one or more aspects of the present disclosure;

FIG. 4B is a bottom perspective view of the edge break apparatus of FIG. 4A in accordance with one or more aspects of the present disclosure FIG. 5 is a method for using an edge break apparatus in accordance with one or more aspects of the present disclosure;

FIG. 6 is a flow chart of an aircraft production and service methodology; and

Figure 7:
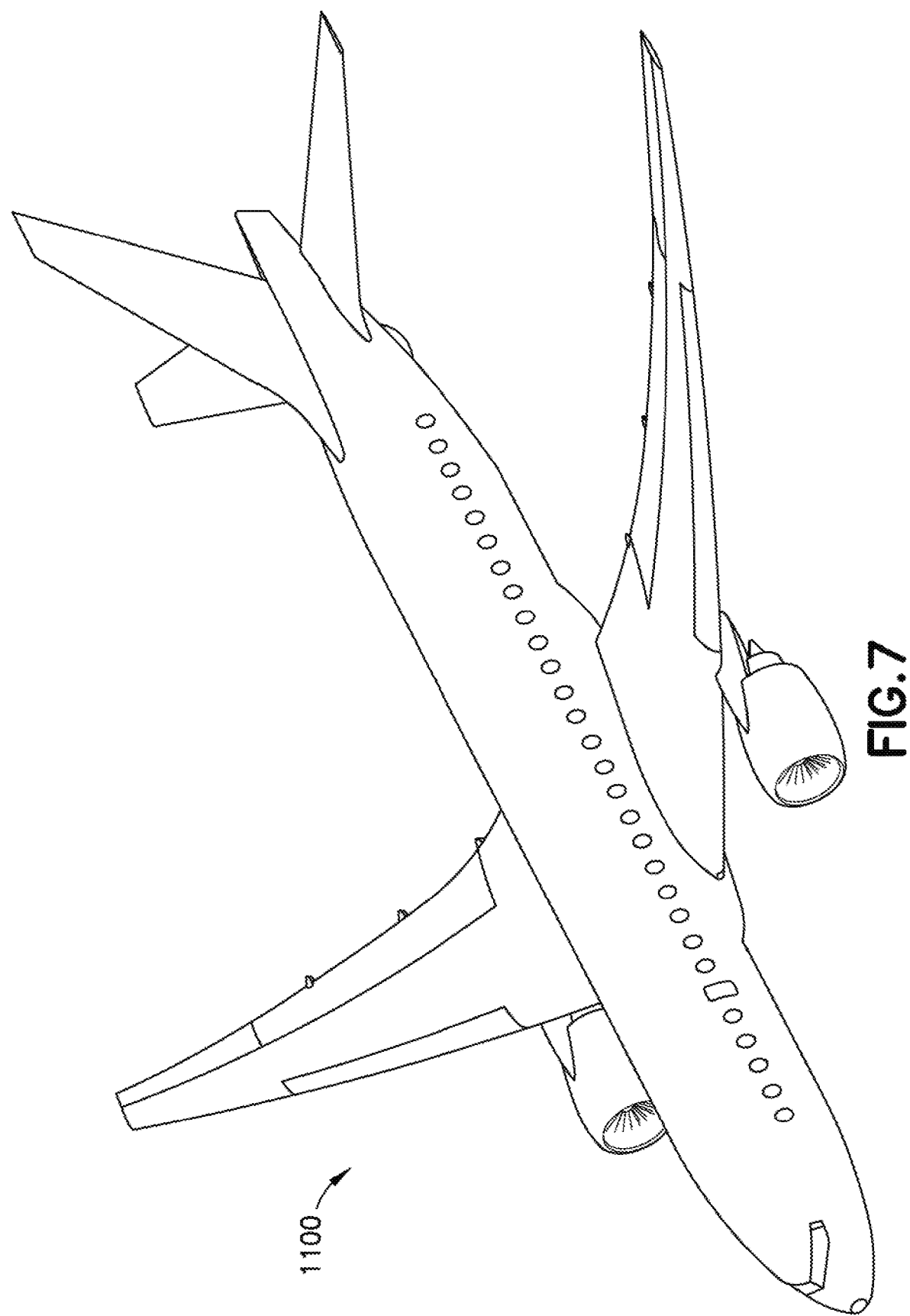

FIG. 7 is a schematic illustration of an aircraft in accordance with one or more aspects of the present disclosure.

FIG. 8 is a schematic illustration of a further aspect of a method in accordance with the present disclosure.

DETAILED DESCRIPTION

Referring to FIGS. 1A-1C, the aspects of the present disclosure described herein may provide an edge break apparatus 100 for breaking/chamfering an edge or corner 999E of a workpiece 999 (e.g., a machined composite part or a part made of any other suitable material such as metal, plastic, etc.). As will be described herein, the edge break apparatus 100 is configured to produce a substantially uniform edge break while substantially reducing under/over removal of material from the edge 999E of the workpiece 999. Further, the edge break apparatus 100 is configured to provide consistent, uniform angles of edge break compared to conventional sanding methods (i.e., different operators using a sanding block and inconsistently sanding the edge 999E of the workpiece 999 at various different angles and depths). The edge break apparatus 100 provides the operator with a high degree of precision (e.g., micrometer adjustments) and confidence such that the edge 999E of the workpiece 999 may be cut to predetermined specifications, allowing the operator to remove material from the edge 999E in precise, predetermined increments. The edge break apparatus 100 also provides consistent edge breaking/cutting (e.g., both depth and surface contour) from operator to operator. Illustrative, non-exhaustive examples, which may or may not be claimed, of the subject matter according to the present disclosure are provided below.

Referring now to FIGS. 1A-1C and 2, in one aspect, the edge break apparatus 100 generally includes a frame 110 and an edge break member 120 interfaced with the frame 110, i.e., the frame 110 is configured to receive and retain the edge break member 120.

In one aspect, the frame 110 includes a first workpiece interface surface 111, a second workpiece interface surface 112, a first aperture 115, and a plurality of protrusions 113P1-113Pn.

The first workpiece interface surface 111 and the second workpiece interface surface 112 of the frame 110 are arranged relative to one another so as to form a predetermined angle α between the first workpiece interface surface 111 and the second workpiece interface surface 112. For example, the first workpiece interface surface 111 and the second workpiece interface surface 112 may be arranged to form about a 90 degree angle or any other suitable degree angle more or less than 90 degrees. The first workpiece interface surface 111 and the second workpiece interface surface 112 arranged relative to one another are configured to engage respective workpiece surfaces 999S1, 999S2 of the workpiece 999 to enable the edge break apparatus 100 to easily move along/on the respective workpiece surfaces 999S1, 999S2 for guiding the edge break member 120 to chamfer the edge 999E of the workpiece 999. The first workpiece interface surface 111 and the second workpiece interface surface 112 of the frame 110 are configured to align substantially flat against each respective workpiece surface 999S1, 999S2 of the workpiece 999, i.e., the predetermined angle α and an angle β, which defines the angle between the two workpiece surfaces 999S1, 999S2 of the workpiece 999, are substantially equal.

Each of the first workpiece interface surface 111 and the second workpiece interface surface 112 have an edge surface 111S, 112S that includes a contour corresponding to a contour of the workpiece surfaces 999S1, 999S2 of the workpiece 999. For example, the contour of each edge surface 111S, 112S may be substantially straight which corresponds to a straight contour of the workpiece surfaces 999S1, 999S2 as illustrated in FIG. 1A. In another example, as illustrated in FIGS. 4A and 4B, the contour of one or more of the edge surfaces 111S, 112S may correspond to a contour 999S1C, 999S2C of a respective workpiece surface 999S1', 999S2'. For example, workpiece surface 999S1' of the workpiece 999' may have a substantially flat contour 999S1C where contour 111C of surface 111S is also substantially flat. Similarly, workpiece surface 999S2' of the workpiece 999' may have a curved contour 999S2C, e.g., an inside radius, an outside radius, or any other suitable contour where the contour 112C of surface 112S substantially matches the contour 999S2C of the workpiece surface 999S2' of the workpiece 999'. The contour of each edge surface 111S, 112S of the first workpiece interface surface 111 and the second workpiece interface surface 112 positions the edge break apparatus 100 relative to the workpiece 999, upon contact with the workpiece 999.

Still referring to FIGS. 1A-1C and 2, in one aspect, the first aperture 115 is configured to receive the edge break member 120. The edge break member 120 extends through and interfaces with the first aperture 115 so as to adjustably define a cutting depth CD of the edge break member 120 relative to an apex APX of the predetermined angle α (i.e., the edge break member 120 is movable axially through the first aperture 115 relative to the first and second workpiece interface surfaces 111, 112 of the frame 110). In one aspect, the first aperture 115 is a threaded aperture including threads 115T having a predetermined pitch. In other aspects, the first aperture 115 may include any other suitable mechanical coupling to receive and retain the edge break member 120.

The first aperture 115 extends through the frame 110 so as to intersect the predetermined angle α formed between the first workpiece interface surface 111 and the second workpiece interface surface 112. In one aspect, the first aperture 115 may extend through the frame 110 along a centerline CL of the frame 110. With the path of the first aperture 115 extending along the centerline CL of the frame 110. In this aspect, the edge break member 120 extending through the first aperture 115 is oriented such that a chamfer angle (e.g., an angle formed on the edge 999E by bisecting the angle α of the first and second workpiece interface surfaces 111, 112 with the edge break member 120 and removing the edge 999E to form a transitional edge between the workpiece surfaces 999S1, 999S2 that would otherwise form a right angle, 90 degrees) of the edge 999E of the workpiece 999 is about 45 degrees as will be further described below. In another aspect, the first aperture 115 may extend through the frame 110 offset from the centerline CL any suitable distance in the X and/or Z direction (it is noted that the X-Y-Z coordinate system illustrated in the figures is exemplary only), such that the edge break member 120 is not directly aligned with the edge 999E (i.e., the edge break member 120 may be configured to produce notches in the workpiece surfaces 999S1, 999S2 relative to the edge 999E). In yet another aspect, as illustrated in FIG. 2B, the first aperture 115 may extend through the frame 110 offset from the centerline CL at an angle γ. In this aspect, the edge break member 120 may be oriented such that the chamfer angle of the edge 999E is more or less than 45 degrees.

Still referring to FIGS. 1A-1C and 2, in one aspect, the plurality of protrusions 113P1-113Pn are circumferentially arranged around the first aperture 115. Each protrusion 113P1-113Pn of the plurality of protrusions 113P1-113Pn is spaced apart a distance S and has a height H. In one aspect, the distance S in addition to the predetermined pitch of the threads 115T of the first aperture 115 defines axial movement in the Y direction of the edge break member 120 relative to the first and second workpiece interface surfaces 111, 112 of the frame 110 as will be further described below. In one aspect, the plurality of protrusions 113P1-113Pn are configured to mate with a corresponding plurality of protrusions 123P1-123Pn of the edge break member 120 as will be further described below.

Referring now to FIGS. 1A-1C and 3, in one aspect, as noted above, the edge break member 120 is configured to extend through and interface with the frame 110, such that the edge break member 120 is movable axially relative to the first and second workpiece interface surfaces 111, 112 of the frame 110. The edge break member 120 includes a housing 122 and a cutting member 124 coupled with the housing 122. In one aspect, the edge break member 120 further includes an engagement member 126 having the plurality of corresponding protrusions 123P1-123Pn, a lock member 127, and a biasing member 140.

In one aspect, the housing 122 of the edge break member 120 includes a second aperture 125 extending axially through the housing 122. In one aspect, the housing 122 further includes corresponding threads 122T forming at least part of an exterior surface 122ES of the housing 122, and a slot 150 axially extending along the exterior surface 122ES as will be further described below. The corresponding threads 122T are configured to mate/engage with the threads 115T of the first aperture 115.

The housing 122 of the edge break member 120 is configured to extend through and movably couple to the first aperture 115 of the frame 110. For example, the corresponding threads 122T of the housing 122 and the threads 115T of the first aperture 115 may form a threaded coupling such that the housing 122 may be rotated in direction R to axially move the housing 122 relative to the frame 110 in the Y direction (i.e., rotating the housing 122 increases or decreases a depth HD of the housing 122 relative to the frame 110 and hence increases or decreases the cutting depth CD). In other aspects, as noted with respect to the first aperture 115, the housing 122 may include any other suitable corresponding mechanical coupling to couple to any suitable mechanical coupling of the first aperture 115 so that the coupling at least in part defines axial movement of the edge break member 120 relative to the frame 110 in the Y direction.

The housing 122 of the edge break member 120 extends through and interfaces with first aperture 115 so as to adjustably define the cutting depth CD of the edge break member 120 relative to the apex APX of the predetermined angle α. In one aspect, predetermined rotational increments of the housing 122 relative to the first aperture 115 of the frame 110 in the direction R, as defined by the plurality of protrusions 113P1-113Pn, defines predetermined increments of axial movement of the edge break member 120 relative to the apex APX of the predetermined angle α in the Y direction, increasing and decreasing the cutting depth CD the edge break member 120 depending on, e.g., the rotation direction of the housing 122.

Still referring to FIGS. 1A-1C and 3, in one aspect, the cutting member 124 comprises a coupling member 124CM extending through the second aperture 125 of the housing 122, and a cutting bit 124CB. In one aspect, the cutting bit 124CB is removably coupled to the coupling member 124CM. For example, the cutting bit 124CB may be threadably coupled to the coupling member 124CM; while in other aspects, the cutting bit 124CB may be coupled to the coupling member 124CM in any suitable manner. In order to prevent the cutting bit 124CB from decoupling from the coupling member 124CM during use of the edge break apparatus 100, a mechanical or chemical lock may be utilized (e.g., a threadlocker and/or set screw). In one aspect, the coupling member 124CM includes a first shoulder 124S1 configured to engage a first end 122A of the housing 122 and the cutting bit 124CB includes a second shoulder 124S2 configured to engage a second end 122B of the housing 122. The first and second shoulders 124S1, 124S2 engage the first and second ends 122A, 122B of the housing 122 so that coupling the cutting bit 124CB to the coupling member 124CM captures the housing 122 between the first shoulder 124S1 of the coupling member 124CM and the second shoulder 124S2 of the cutting bit 124CB.

In one aspect, the cutting bit 124 includes an abrasive feature 124AB provided to remove material from the edge 999E of the workpiece 999. For example, the cutting bit 124 may include a diamond abrasive or any other suitable abrasive to remove the material from the edge 999E. In one aspect, the cutting bit 124CB may have a flat contour (as shown) to provide a substantially flat chamfer to the edge 999E of the workpiece 999. In other aspects, the cutting bit 124 may have a rounded edge, such that the cutting bit 124CB provides the edge 999E with a contour having a radius, or any other suitable contour.

In one aspect, one or more of the housing 122 and the cutting member 124 include a rotary tool engagement coupling feature 130. The rotary tool engagement coupling feature 130 may provide for coupling of a rotary tool 180 to the edge break apparatus 100. In this aspect, the cutting member 124 may be rotatably coupled to the housing 122. For example, the second aperture 125 may be a clearance fit, allowing enough clearance, such that the coupling member 124CM may rotate within the second aperture 125; while other aspects, one or more bearings may be disposed in the second aperture 125 where the coupling member 124CM is coupled to the bearings for rotation of the cutting member 124. The rotary tool 180, such as an electric or pneumatic rotary tool, may provide rotation to the coupling member 124CM within the second aperture 125 and accordingly, the cutting bit 124CB coupled to the coupling member 124CM. In this aspect, the cutting bit 124CB may be in the form of an end mill or other bit capable of cutting with at least the end of the bit.

Still referring to FIGS. 1A-1C and 3, as noted above, in one aspect, the edge break member 120 further includes the engagement member 126. The engagement member 126 is configured to engage/disengage with the frame 110 as described herein. In one aspect, the engagement member 126 includes a central aperture 126CA, an engagement protrusion 126P, and a plurality of corresponding protrusions 123P1-123Pn. The central aperture 126CA is configured to receive the housing 122, such that the housing 122 extends through the central aperture 126CA of the engagement member 126. With the housing 122 extending through the central aperture 126CA, the engagement protrusion 126P mates with the axially extending slot 150 of the housing 122 to rotationally fix the engagement member 126 relative to the housing 122 while simultaneously providing free axial movement of the engagement member 126 in the Y direction. In one aspect, the engagement protrusion 126P is a pin, a set screw, or any other suitable protrusion configured to mate with the slot 150. The engagement protrusion 126P may be held/coupled to the engagement member 126 so as to be fixed (e.g., does not move during operation/use of the edge break apparatus 100) to the engagement member 126.

In one aspect, the plurality of corresponding protrusions 123P1-123Pn are circumferentially disposed around the central aperture 126CA. Substantially similar to the plurality of protrusions 113P1-113Pn, each protrusion 123P1-123Pn of the plurality of corresponding protrusions 123P1-123Pn is spaced apart a distance S and has a height H. The plurality of corresponding protrusions 123P1-123Pn are configured to engage with the plurality of protrusions 113P1-113Pn of the frame 110 and define the predetermined rotational increments of the edge break member 120 relative to the frame 110. While engaged, the plurality of corresponding protrusions 123P1-123Pn and the plurality of protrusions 113P1-113Pn of the frame 110 rotationally fix the engagement member 126 relative to the frame 110, such that the edge break member 120 may not be rotated in the R direction about the axis AX. As noted above, the engagement protrusion 126P mated with the slot 150 of the housing 122 provides the engagement member 126 free axial movement in the Y direction relative to the housing 122, so that the engagement member 126 may be moved away from the frame 110 disengaging the engagement member 126 from the frame 110 (i.e., the plurality of corresponding protrusions 123P1-123Pn disengage from the plurality of protrusions 113P1-113Pn). With the engagement member 126 disengaged, the engagement member 126 may be rotated in direction R about the axis AX which simultaneously rotates the housing 122 in the direction R via the interface between the engagement protrusion 126P and the axially extending slot 150. In one aspect, the predetermined rotational increments are equal to the spacing S between each corresponding protrusions 123P1-123Pn. The predetermined rotational increments defined by the spacing S translate into predetermined increments of axial movement of the cutting member 124 and provide for adjusting the cutting depth CD by any suitable incremental amount. For example, rotating the engagement member 126 a single distance/spacing S may move the cutting member 124 axially in the Y direction an amount equal to about 0.001 inches (0.0254 mm). In other aspects, the spacing S may be configured so that the spacing S corresponds to axial movement of the cutting member 124 that is greater than or less than about 0.001 inches (0.0254 mm).

Still referring to FIGS. 1A-1C and 3, the lock member 127 of the edge break member 120 includes a threaded central aperture 127CA. In one aspect, the housing 122 is threadably engaged to the threaded central aperture 127CA of the lock member 127 and passes through the central aperture 126CA of the engagement member 126. The engagement member 126 and the lock member 127 are independently movable axially along the housing 122. In one aspect, the lock member 127 at least partially effects coupling and decoupling of the plurality of corresponding protrusions 123P1-123Pn and the plurality of protrusions 113P1-113Pn. For example, moving (e.g., by rotating the lock member 127 relative to the housing 122) the lock member 127 axially along the housing 122 in direction Y away from the frame 110, releases the engagement member 126. For example, rotating the lock member 127 relative to the housing 122 creates a space SM between the lock member 127 and the engagement member 126 providing for axial movement of the engagement member 126 in the space provided between the lock member 127 and the frame 110 as shown in FIG. 1D. It is noted that the biasing member 140 disposed between the engagement member 126 and the lock member 127 biases the engagement member 126 towards the plurality of protrusions 113P1-113Pn when the space SM is provided. Once released, the engagement member 126 also may be moved away from the frame 110 in direction Y to decouple the plurality of corresponding protrusions 123P1-123Pn and the plurality of protrusions 113P1-113Pn. To lock the engagement member 126 in place, the lock member 127 is moved axially along the housing 122 in direction Y toward the frame 110.

In one aspect, the edge break member 100 further includes the biasing member 140 disposed between the lock member 127 and the engagement member 126. As described above, the biasing member 140 is configured to bias the coupling of the plurality of corresponding protrusions 123P1-123Pn and the plurality of protrusions 113P1-113Pn while the lock member 127 is decoupled from the engagement member 126.

Referring now to FIGS. 1, 4 and 5, a method 500 for using an edge break apparatus is illustrated. In one aspect, the edge break member 120 is interfaced with the frame 110 through the first aperture 115. The edge break member 120 is incrementally moved relative to the first workpiece interface surface 111 and the second workpiece interface surface 112 of the frame 110 to adjustably increase or decrease the cutting depth CD of the edge break member 120 relative to the first workpiece interface surface 111 and the second workpiece interface surface 112 of the frame 110 (FIG. 5, Block 501). The first workpiece interface surface 111 and the second workpiece interface surface 112 of the frame 110 are engaged with each respective surface 999S1, 999S2 of the workpiece 999 adjacent the edge 999E (FIG. 5, Block 502). The edge break apparatus 100 is slid along the workpiece surfaces 999S1, 999S2, so that the edge break member 120 chamfers the edge 999E of the workpiece 999 to provide a predetermined workpiece edge contour (FIG. 5, Block 503).

The edge break apparatus 100 may be slid back and forth in direction A (FIG. 4) along the edge 999E of the workpiece to chamfer the edge 999E any suitable number of times, such as until an operator feels that the workpiece is no longer being cut, e.g., due to the set depth of the cutting member 124 relative to the first and second workpiece interface surfaces 111, 112. In one aspect, the edge break apparatus 100 may be slid back and forth in direction A multiple times in order to achieve the desired depth of the contour. In one aspect, after each pass, the edge break member 120 cutting depth CD may be increased to achieve the desired depth of the contour. For example, the edge break member 120 is incrementally moved relative to the first and second workpiece interface surfaces 111, 112 by disengaging the plurality of corresponding protrusions 123P1-123Pn of the edge break member 120 from the plurality of protrusions 113P1-113Pn of the frame 110. The plurality of protrusions 113P1-113Pn of the frame 110 may be disengaged from the plurality of corresponding protrusions 123P1-123Pn of the edge break member 120 by moving the engagement member 126 in the Y direction at least a distance equal to or greater than the height H of the protrusions 113P1-113Pn, 123P1-123Pn. While disengaged, the engagement member 126 is rotated any suitable number of distances S relative to the frame 110 in direction R. Upon rotating the engagement member 126, the plurality of corresponding protrusion 123P1-123Pn are reengaged with the plurality of protrusion 113P1-113Pn to fix a rotational relationship between the frame 110 and the edge break member 120.

In one aspect, the cutting bit 124CB of the edge break member 120 is decoupled from the coupling member 124CM of the edge break member 120 and a different cutting bit is coupled to the coupling member 124CM of the edge break member 120.

Examples of the present disclosure may be described in the context of aircraft manufacturing and service method 1000 as shown in FIG. 6. In other aspects, the examples of the present disclosure may be applied in any suitable industry, such as e.g. automotive, maritime, aerospace, etc. With respect to aircraft manufacturing, during pre-production, illustrative method 1000 may include specification and design (block 1002) of aircraft 1100 (FIG. 7) and material procurement (block 1004). During production, component and subassembly manufacturing (block 1006) and system integration (block 1008) of aircraft 1100 may take place. Thereafter, aircraft 1100 may go through certification and delivery (block 1010) to be placed in service (block 1012). While in service, aircraft 1100 may be scheduled for routine maintenance and service (block 1014). Routine maintenance and service may include modification, reconfiguration, refurbishment, etc. of one or more systems of aircraft 1100 which may include use of the edge break apparatus 100 as described herein.

Each of the processes of illustrative method 1000 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Apparatus(es) and method(s) shown or described herein may be employed during any one or more of the stages of the manufacturing and service method 1000. For example, components or subassemblies corresponding to component and subassembly manufacturing (block 1006) may be fabricated or manufactured in a manner similar to components or subassemblies produced while aircraft 1400 is in service (block 1012). Also, one or more examples of the apparatus (es), method(s), or combination thereof may be utilized during production stages 1006 and 1008, for example, by substantially expediting assembly of or reducing the cost of aircraft 1100. Similarly, one or more examples of the apparatus or method realizations, or a combination thereof, may be utilized, for example and without limitation, while aircraft 1100 is in service (block 1012) and/or during maintenance and service (block 1014).

The following are provided in accordance with the aspects of the present disclosure:

A1. An edge break apparatus comprising:
a frame having
a first workpiece interface surface,
a second workpiece interface surface arranged relative to the first workpiece interface surface so as to form a predetermined angle between the first workpiece surface and the second workpiece surface, and
a first aperture extending through the frame so as to intersect the predetermined angle; and
an edge break member extending through and interfaced with the first aperture so as to adjustably define a cutting depth of the edge break member relative to an apex of the predetermined angle.

A2. The edge break apparatus of paragraph A1, wherein the frame includes a plurality of protrusions and the edge break member includes a plurality of corresponding protrusions configured to mate with the plurality of protrusions to define predetermined rotational increments of the edge break member relative to the frame.

A3. The edge break apparatus of paragraph A2, wherein the first aperture is a threaded aperture and the edge break member includes corresponding threads to form a threaded coupling with the first aperture where the predetermined rotational increments and the threaded coupling define predetermined increments of axial movement of the edge break member relative to the apex.

A4. The edge break apparatus of paragraph A1, wherein the edge break member comprises:
a housing configured to engage the first aperture; and
a cutting member coupled to the housing.

A5. The edge break apparatus of paragraph A4, wherein the housing includes a second aperture extending axially through the housing and the cutting member comprises a coupling member extending through the second aperture and a cutting bit, where the cutting bit is removably coupled to the coupling member.

A6. The edge break apparatus of paragraph A5, wherein the coupling member includes a first shoulder configured to engage the housing and the cutting bit includes a second shoulder configured to engage the housing so that coupling the cutting bit to the coupling member captures the housing between the first shoulder and the second shoulder.

A7. The edge break apparatus of paragraph A4, wherein the cutting member is rotatably coupled to the housing.

A8. The edge break apparatus of paragraph A7, wherein one or more of the housing and the cutting member include a rotary tool engagement coupling feature.

A9. The edge break apparatus of paragraph A4, wherein the housing includes threads forming at least part of an exterior surface of the housing and the frame includes a plurality of protrusions circumferentially arranged around the first aperture, the edge break member further comprises:
an engagement member having a central aperture and a plurality of corresponding protrusions, circumferentially disposed around the central aperture, configured to mate with the plurality of protrusions, the engagement member being rotationally fixed relative to the housing; and
a lock member having a threaded central aperture;
wherein the housing is threadably engaged to the threaded central aperture of the lock member and passes through the central aperture of the engagement member so that the engagement member and the lock member are independently movable axially along the housing to effect coupling and decoupling of the plurality of corresponding protrusions and the plurality of protrusions.

A10. The edge break apparatus of paragraph A9, further comprising a biasing member disposed between the lock member and the engagement member configured to bias the coupling of the plurality of corresponding protrusions and the plurality of protrusions.

A11. The edge break apparatus of paragraph A9, wherein the exterior surface of the housing includes an axially extending slot and the engagement member includes an engagement protrusion that engages the axially extending slot for rotationally fixing the engagement member relative to the housing.

A12. The edge break apparatus of paragraph A1, wherein the predetermined angle is about 90 degrees and the edge break member is configured to provide about a 45 degree workpiece chamfer.

A13. The edge break apparatus of paragraph A1, wherein the edge break member is configured to provide a predetermined workpiece contour that comprise a radius.

A14. The edge break apparatus of paragraph A1, wherein the first workpiece interface surface and the second workpiece interface surface are configured to engage a workpiece, where the first workpiece interface surface and the second workpiece interface surface comprise an edge surface that has a contour corresponding to a surface contour of workpiece.

A15. The edge break apparatus of paragraph A14, wherein the contour is a contour of an inside radius.

A16. The edge break apparatus of paragraph A14, wherein the contour is a contour of an outside radius.

A17. The edge break apparatus of paragraph A14, wherein the contour is a straight contour.

B1. An edge break apparatus comprising:
a frame having a first aperture and an edge surface configured to engage workpiece surfaces adjacent a corner of a workpiece; and an edge break member extending through the first aperture, the edge break member being configured to cut the corner of the workpiece to provide a predetermined workpiece edge contour;

where the edge break member is coupled to the frame so as to be incrementally movable relative to the edge surface for adjustably increasing or decreasing a size of the predetermined workpiece contour.

B2. The edge break apparatus of paragraph B1, wherein the edge surface includes:

a first workpiece interface surface; and a second workpiece interface surface arranged relative to the first workpiece interface surface so as to form a predetermined angle between the first workpiece surface and the second workpiece surface, the predetermined angle corresponding to an angle between the workpiece surfaces.

B3. The edge break apparatus of paragraph B2, wherein:

the frame includes a first aperture extending through the frame so as to intersect the predetermined angle; and the edge break member extends through and is interfaced with the first aperture so as to adjustably define a cutting depth of the edge break member relative to an apex of the predetermined angle.

B4. The edge break apparatus of paragraph B1, wherein the frame includes a plurality of protrusions and the edge break member includes a plurality of corresponding protrusions configured to mate with the plurality of protrusions to define predetermined rotational increments of the edge break member relative to the frame.

B5. The edge break apparatus of paragraph B4, wherein the first aperture is a threaded aperture and the edge break member includes corresponding threads to form a threaded engagement with the first aperture where the predetermined rotational increments and the threaded engagement define predetermined increments of axial movement of the edge break member relative to the edge surface.

B6. The edge break apparatus of paragraph B1, wherein the edge break member comprises:

a housing configured to engage the first aperture; and a cutting member coupled to the housing.

B7. The edge break apparatus of paragraph B6, wherein the housing includes a second aperture extending axially through the housing and the cutting member comprises a coupling member extending through the second aperture and a cutting bit, where the cutting bit is removably coupled to the coupling member.

B8. The edge break apparatus of paragraph B7, wherein the coupling member includes a first shoulder configured to engage the housing and the cutting bit includes a second shoulder configured to engage the housing so that coupling the cutting bit to the coupling member captures the housing between the first shoulder and the second shoulder.

B9. The edge break apparatus of paragraph B6, wherein the cutting member is rotatably coupled to the housing.

B10. The edge break apparatus of paragraph B9, wherein one or more of the housing and the cutting member include a rotary tool engagement coupling feature.

B11. The edge break apparatus of paragraph B6, wherein the housing includes threads forming at least part of an exterior surface of the housing and the frame includes a plurality of protrusions circumferentially arranged around the first aperture, the edge break member further comprises:

an engagement member having a central aperture and a plurality of corresponding protrusions, circumferentially disposed around the central aperture, configured to mate with the plurality of protrusions, the engagement member being rotationally fixed relative to the housing; and a lock member having a threaded central aperture;

wherein the housing is threadably engaged to the threaded central aperture of the lock member and passes through the central aperture of the engagement member so that the engagement member and the lock member are independently movable axially along the housing to effect coupling and decoupling of the plurality of corresponding protrusions and the plurality of protrusions.

B12. The edge break apparatus of paragraph B11, further comprising a biasing member disposed between the lock member and the engagement member configured to bias the coupling of the plurality of corresponding protrusions and the plurality of protrusions.

B13. The edge break apparatus of paragraph B11, wherein the exterior surface of the housing includes an axially extending slot and the engagement member includes an engagement protrusion that engages the axially extending slot for rotationally fixing the engagement member relative to the housing.

B14. The edge break apparatus of paragraph B1, wherein the edge break member is configured to provide a predetermined workpiece contour that comprises about a 45 degree chamfer.

B15. The edge break apparatus of paragraph B1, wherein the edge break member is configured to provide a predetermined workpiece contour that comprise a radius.

B16. The edge break apparatus of paragraph B1, wherein the edge surface has a contour corresponding to a surface contour of workpiece.

B17. The edge break apparatus of paragraph B16, wherein the contour is a contour of an inside radius.

B18. The edge break apparatus of paragraph B16, wherein the contour is a contour of an outside radius.

B19. The edge break apparatus of paragraph B16, wherein the contour is a straight contour.

C1. A method for using an edge break apparatus including a frame having a first aperture and an edge surface and an edge break member extending through the first aperture, the method comprising:

incrementally moving the edge break member relative to the edge surface to adjustably increase or decrease a cutting depth of the edge break member relative to the edge surface;

engaging workpiece surfaces adjacent a corner of a workpiece with the edge surface of the frame; and cutting the corner of the workpiece, by sliding the edge break apparatus along the workpiece surfaces, to provide a predetermined workpiece edge contour.

C2. The method of paragraph C1, wherein incrementally moving the edge break member relative to the edge surface comprises:

disengaging a plurality of protrusions of the frame from a plurality of corresponding protrusions of the edge break member and rotating the edge break member relative to the frame; and engaging the plurality of protrusion with the plurality of corresponding protrusion to fix a rotational relationship between the frame and the edge break member.

C3. The method of paragraph C1, further comprising decoupling a cutting bit of the edge break member from a housing of the edge break member and coupling a different cutting bit to the housing of the edge break member.

C4. The method of paragraph C1, further comprising coupling one or more of the frame and the edge break member to a rotary tool In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 5 and 6, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 5 and 6 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:
1. An edge break apparatus comprising:
a frame having
a first workpiece interface surface,
a second workpiece interface surface arranged relative to the first workpiece interface surface so as to form a predetermined angle between the first workpiece interface surface and the second workpiece interface surface, a first aperture extending through the frame so as to intersect the predetermined angle, and
a plurality of frame protrusions; and
an edge break member having
a housing configured to extend through and engage the first aperture, the housing includes threads forming at least part of an exterior surface of the housing, and
an engagement member having a plurality of engagement member protrusions configured to mate with the plurality of frame protrusions so as to adjustably define, in a plurality of predefined rotational increments of the engagement member, a cutting depth of the edge break member relative to an apex of the predetermined angle, wherein the edge break member is configured so as to be rotationally fixed relative to the frame in each of the plurality of predefined rotational increments.

2. The edge break apparatus of claim 1, wherein the edge break member comprises
a cutting member coupled to the housing.

3. The edge break apparatus of claim 2, wherein:
the housing includes a second aperture that extends through the housing; and
the cutting member comprises:
a coupling member extending through the second aperture, and
a cutting bit,
where the cutting bit is removably coupled to the coupling member.

4. The edge break apparatus of claim 3, wherein the coupling member includes a first shoulder configured to engage the housing and the cutting bit includes a second shoulder configured to engage the housing so that coupling the cutting bit to the coupling member captures the housing between the first shoulder and the second shoulder.

5. The edge break apparatus of claim 2, wherein:
the plurality of frame protrusions are circumferentially arranged around the first aperture;
the engagement member has a central aperture, and the plurality of engagement member protrusions are circumferentially disposed around the central aperture;
the engagement member is rotationally fixed relative to the housing; and
the edge break member further comprises:
a lock member having a threaded central aperture;
wherein the housing is threadably engaged to the threaded central aperture of the lock member and passes through the central aperture of the engagement member so that the engagement member and the lock member are independently movable relative to the housing to effect coupling and decoupling of the plurality of engagement member protrusions and the plurality of frame protrusions.

6. The edge break apparatus of claim 5, further comprising a biasing member disposed between the lock member and the engagement member, the biasing member being configured to bias the coupling of the plurality of engagement member protrusions and the plurality of frame protrusions.

7. The edge break apparatus of claim 5, wherein the exterior surface of the housing includes a slot and the engagement member includes an engagement protrusion that engages the slot for rotationally fixing the engagement member relative to the housing.

8. The edge break apparatus of claim 1, wherein the predetermined angle is 90 degrees and the edge break member is configured to provide a workpiece chamfer.

9. An edge break apparatus comprising:
a frame having:
a first aperture, and
edge surfaces, each edge surface being configured to engage a respective workpiece surface adjacent a corner of a workpiece; and
an edge break member extending through the first aperture, the edge break member being configured to cut the corner of the workpiece to provide a predetermined workpiece edge contour;
where the edge break member is coupled to the frame so as to be incrementally movable relative to the edge surfaces for adjustably increasing or decreasing a size of the predetermined workpiece edge contour, the edge break member being incrementally movable so as to be rotationally fixed relative to the frame in each of a plurality of predefined rotational increments; and
wherein the frame includes a plurality of frame protrusions and the edge break member includes a plurality of engagement member protrusions configured to mate with the plurality of frame protrusions to define the plurality of predefined rotational increments of the edge break member relative to the frame.

10. The edge break apparatus of claim 9, wherein the first aperture is a threaded aperture and the edge break member includes corresponding threads to form a threaded engagement with the first aperture, where the plurality of predefined rotational increments and the threaded engagement define predetermined increments of movement of the edge break member along an edge break member axis relative to the edge surfaces.

11. The edge break apparatus of claim 9, wherein the edge break member comprises:
a housing configured to engage the first aperture; and
a cutting member coupled to the housing.

12. The edge break apparatus of claim 11, wherein the cutting member is rotatably coupled to the housing.

13. The edge break apparatus of claim 12, wherein one or more of the housing and the cutting member include a rotary tool engagement coupling feature.

14. The edge break apparatus of claim 9, wherein the edge break member is configured to provide the predetermined workpiece edge contour, wherein the predetermined workpiece edge contour comprises a radius.

15. The edge break apparatus of claim 9, wherein each of the edge surfaces has a contour corresponding to a surface contour of the workpiece.

16. The edge break apparatus of claim 9, further comprising a biasing member configured to bias coupling of the plurality of engagement member protrusions and the plurality of frame protrusions.

17. A method for using an edge break apparatus according to claim 1, the method comprising:
incrementally moving the edge break member relative to at least one of the first workpiece interface surface and the second workpiece interface surface to adjustably increase or decrease a cutting depth of the edge break member relative to the at least one of the first workpiece interface surface and the second workpiece interface surface, the cutting depth being adjustably increased or decreased by rotationally fixing the engagement member of the edge break member relative to the frame in each of the plurality of predefined rotational increments;
engaging workpiece surfaces adjacent a corner of a workpiece with the workpiece interface surfaces of the frame; and cutting the corner of the workpiece, by sliding the edge break apparatus along the workpiece surfaces, to provide a predetermined workpiece edge contour.

18. The method of claim 17, wherein incrementally moving the edge break member relative to at least one of the first workpiece interface surface and the second workpiece interface surface comprises:

disengaging the plurality of frame protrusions of the frame from the plurality of engagement member protrusions of the edge break member and rotating the edge break member relative to the frame; and engaging the plurality of frame protrusions with the plurality of engagement member protrusions to fix a rotational relationship between the frame and the edge break member.

19. The method of claim 17, further comprising decoupling a cutting bit of the edge break member from the housing of the edge break member and coupling a different cutting bit to the housing of the edge break member.

20. The method of claim 17, further comprising coupling one or more of the frame and the edge break member to a rotary tool.

* * * * *